United States Patent
Hazra et al.

(10) Patent No.: US 10,664,526 B2
(45) Date of Patent: *May 26, 2020

(54) SUGGESTED KEYWORDS FOR SEARCHING CONTENT ON ONLINE SOCIAL NETWORKS

(71) Applicant: Facebook, Inc., Menlo Park, CA (US)

(72) Inventors: Kurchi Subhra Hazra, Mountain View, CA (US); Jinlong Zhou, Fremont, CA (US); Xiao Li, Cupertino, CA (US); Maxime Boucher, Mountain View, CA (US); Rajat Raina, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 15/964,596

(22) Filed: Apr. 27, 2018

(65) Prior Publication Data

US 2018/0246902 A1    Aug. 30, 2018

Related U.S. Application Data

(63) Continuation of application No. 14/561,418, filed on Dec. 5, 2014, now Pat. No. 9,990,441.

(51) Int. Cl.
| | | |
|---|---|---|
| *G06F 16/9032* | (2019.01) | |
| *G06F 16/332* | (2019.01) | |
| *G06F 40/205* | (2020.01) | |
| *G06Q 50/00* | (2012.01) | |

(52) U.S. Cl.
CPC .... *G06F 16/90324* (2019.01); *G06F 16/3322* (2019.01); *G06F 40/205* (2020.01); *G06Q 50/01* (2013.01)

(58) Field of Classification Search
CPC ........... G06F 16/90324; G06F 16/3322; G06F 17/2705; G06F 40/205; G06Q 50/01
See application file for complete search history.

(56) References Cited

U.S. PATENT DOCUMENTS

| | | | |
|---|---|---|---|
| 6,338,055 B1 * | 1/2002 | Hagmann | G06F 16/24534 |
| 2008/0077582 A1 * | 3/2008 | Reed | G06F 16/951 |
| 2008/0091744 A1 * | 4/2008 | Shitomi | G06F 16/2228 |
| 2009/0119276 A1 * | 5/2009 | Neron | G06F 16/951 |
| 2009/0319518 A1 * | 12/2009 | Koudas | G06F 16/951 |

(Continued)

*Primary Examiner* — Jorge A Casanova
(74) *Attorney, Agent, or Firm* — Jordan IP Law, LLC

(57) ABSTRACT

In one embodiment, a method includes receiving, from a client system of a first user, a text query to search for posts of the online social network, the text query comprising one or more n-grams, searching a personalized index of keyword phrases associated with the first user to identify one or more keyword phrases matching one or more of the n-grams of the text query, the index of keyword phrases being based on content extracted from posts by one or more second users that have been viewed by the first user, and providing to the client system in response to receiving the text query, instructions for displaying a user interface comprising one or more of suggested queries to search for posts of the online social network, wherein each suggested query comprises one or more n-grams from the text query and one or more of the identified keyword phrases.

21 Claims, 8 Drawing Sheets

(56) References Cited

U.S. PATENT DOCUMENTS

| | | | |
|---|---|---|---|
| 2010/0121860 A1* | 5/2010 | Pan | G06F 16/90324 |
| | | | 707/748 |
| 2011/0008020 A1* | 1/2011 | Inoue | G11B 27/105 |
| | | | 386/296 |
| 2012/0124071 A1* | 5/2012 | Gebhard | G06F 16/90332 |
| | | | 707/767 |
| 2012/0179751 A1* | 7/2012 | Ahn | G06Q 30/0282 |
| | | | 709/204 |
| 2013/0124542 A1* | 5/2013 | Lee | G06Q 50/01 |
| | | | 707/751 |

* cited by examiner

US 10,664,526 B2

SUGGESTED KEYWORDS FOR SEARCHING CONTENT ON ONLINE SOCIAL NETWORKS

PRIORITY

This application is a continuation under 35 U.S.C. § 120 of U.S. patent application Ser. No. 14/561,418, filed 5 Dec. 2014.

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may generate personalized keyword suggestions for search posts and other content of the online social network based on newsfeed posts the user has seen or could have seen. The social-networking system may provide high-quality keyword suggestions in response to a user inputting a text string into a query field. In some embodiments, the social-networking system may generate an index of phrases associated with the querying user by extracting keywords form posts the user has seen or could have seen. From this set of keywords, the social-networking system may identify phrases from the index of phrases that match the query. Matching phrases may then be scored or ranked, and top keywords may be sent back to the querying user as keyword suggestions to complete the user's query. As an example and not by way of limitation, if a first user has engaged with a number of posts related to the New York Giants professional football team, the social-networking system may generate an index of phrases including "giants", "giants new york", and "giants football". If the first user enters "giant" into the query field, the social-networking system may provide the first user with the keyword suggestions "giants", "giants new york", and "giants football". As another example and not by way of limitation, if a second user has engaged with a number of posts related to the San Francisco Giants professional baseball team, the social-networking system may generate an index of phrases including "giants", "giants san francisco", and "giants baseball". If the second user enters "giant" into the query field, the social-networking system may provide the second user with the keyword suggestions "giants", "giants san francisco", and "giants baseball".

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
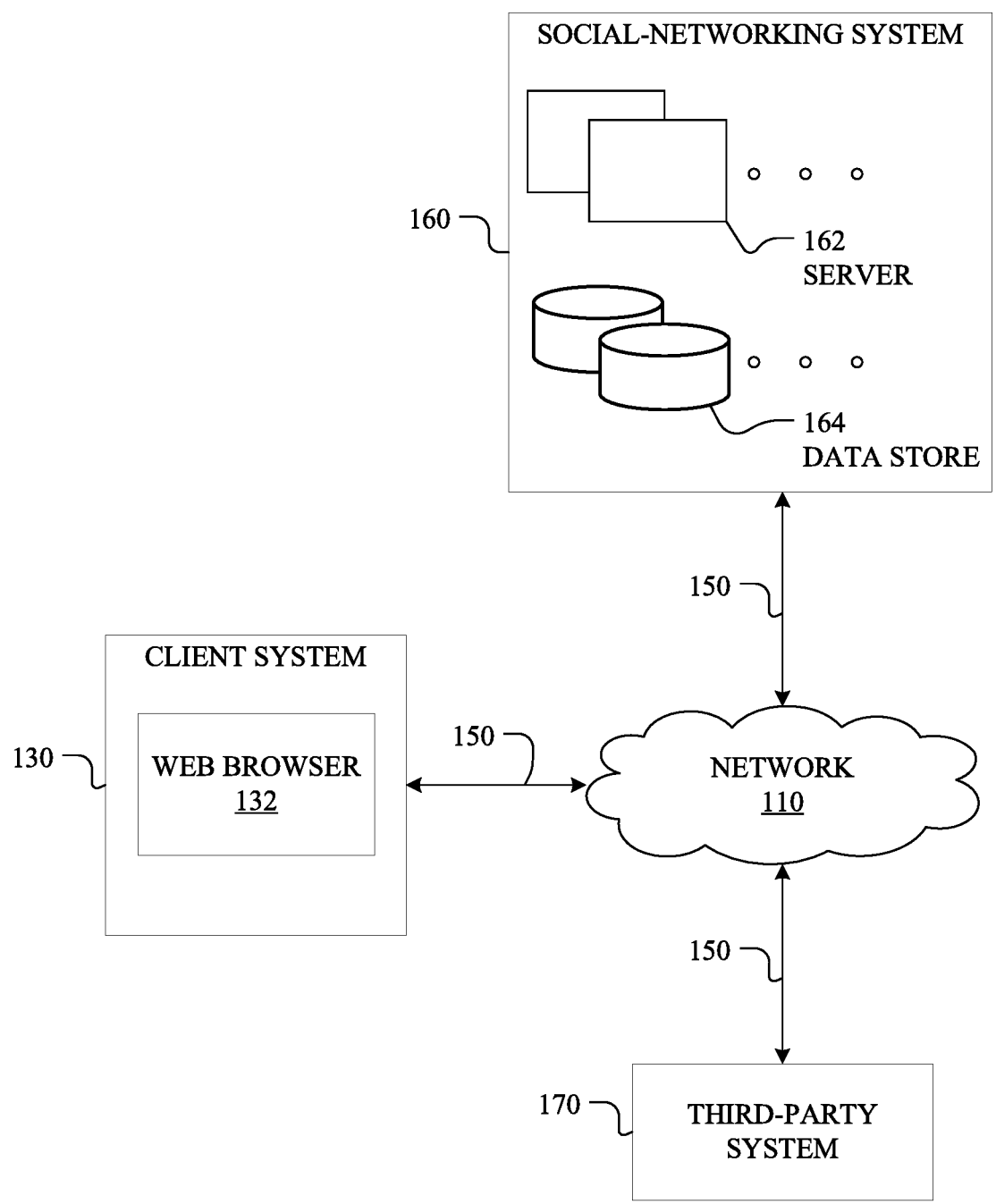
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
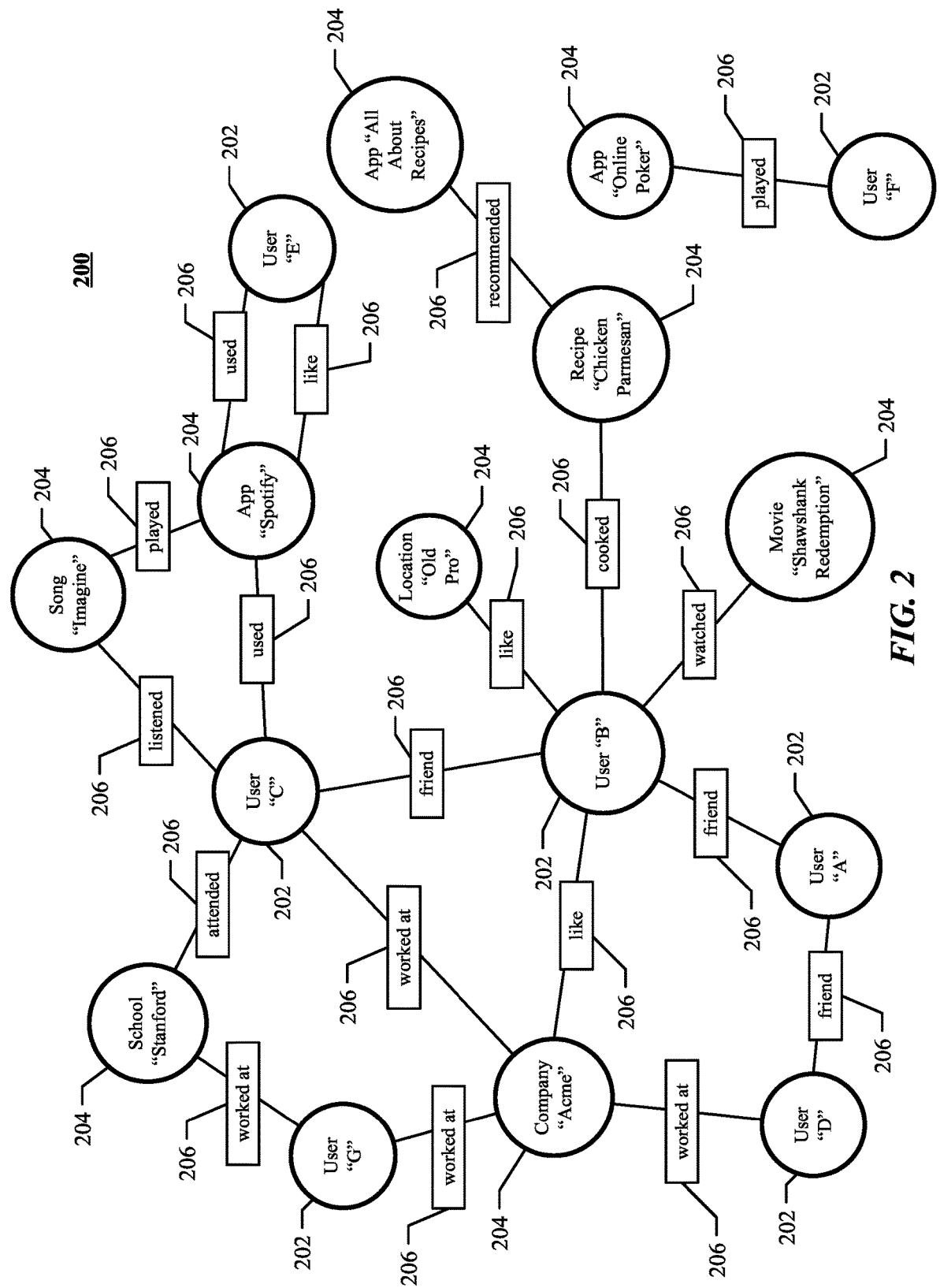
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Typeahead Processes

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element.

In particular embodiments, as a user types or otherwise enters text into a form used to add content or make declarations in various sections of the user's profile page, home page, or other page, the typeahead process may work in conjunction with one or more frontend (client-side) and/or backend (server-side) typeahead processes (hereinafter referred to simply as "typeahead process") executing at (or within) the social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, may be able to predict a user's intended declaration with a high degree of precision. However, the social-networking system 160 can also provide users with the freedom to enter essentially any declaration they wish, enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the frontend-typeahead process may send the entered character string as a request (or call) to the backend-typeahead process executing within social-networking system 160. In particular embodiments, the typeahead processes may communicate via AJAX (Asynchronous JavaScript and XML) or other suitable techniques, and particularly, asynchronous techniques. In particular embodiments, the request may be, or comprise, an XMLHTTPRequest (XHR) enabling quick and dynamic sending and fetching of results. In particular embodiments, the typeahead process may also send before, after, or with the request a section identifier (section ID) that identifies the particular section of the particular page in which the user is making the declaration. In particular embodiments, a user ID parameter may also be sent, but this may be unnecessary in some embodiments, as the user may already be "known" based on the user having logged into (or otherwise been authenticated by) the social-networking system 160.

In particular embodiments, the typeahead process may use one or more matching algorithms to attempt to identify matching social-graph elements. In particular embodiments, when a match or matches are found, the typeahead process may send a response (which may utilize AJAX or other suitable techniques) to the user's client system 130 that may include, for example, the names (name strings) or descriptions of the matching social-graph elements as well as, potentially, other metadata associated with the matching social-graph elements. As an example and not by way of limitation, if a user entering the characters "pok" into a query field, the typeahead process may display a drop-down menu that displays names of matching existing profile pages and respective user nodes 202 or concept nodes 204, such as a profile page named or devoted to "poker" or "pokemon", which the user can then click on or otherwise select thereby confirming the desire to declare the matched user or concept name corresponding to the selected node. As another example and not by way of limitation, upon clicking "poker," the typeahead process may auto-populate, or causes the web browser 132 to auto-populate, the query field with the declaration "poker". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

Structured Search Queries

Figure 3:
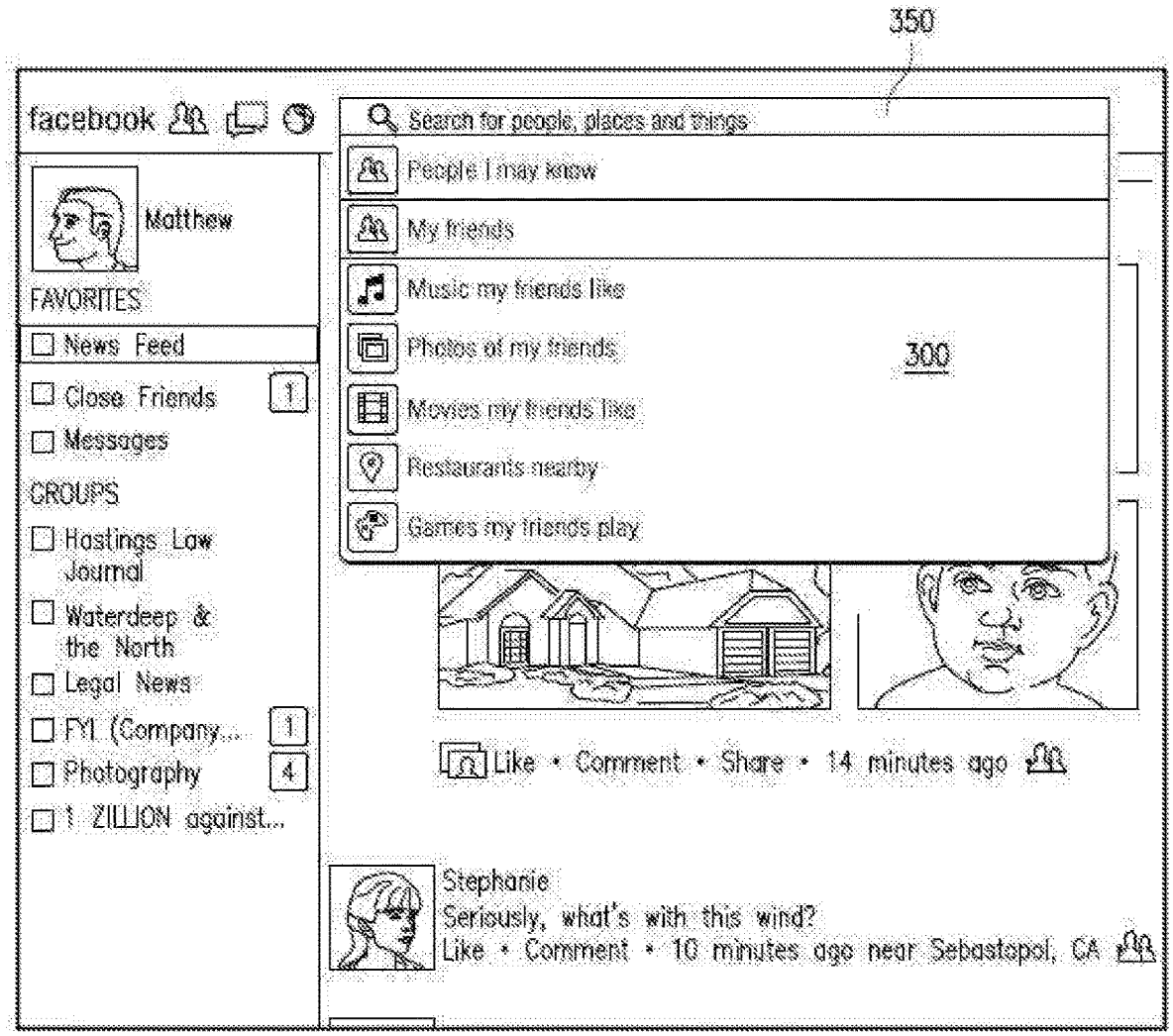
FIG. 3 illustrates an example page of an online social network.

FIG. 3 illustrates an example page of an online social network. In particular embodiments, a user may submit a query to the social-networking system 160 by inputting text into query field 350. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into query field 350 to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

In particular embodiments, the typeahead processes described herein may be applied to search queries entered by a user. As an example and not by way of limitation, as a user enters text characters into a query field 350, a typeahead process may attempt to identify one or more user nodes 202, concept nodes 204, or edges 206 that match the string of characters entered into query field 350 as the user is entering the characters. As the typeahead process receives requests or calls including a string or n-gram from the text query, the typeahead process may perform or causes to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu 300 that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu 300. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Figure 4A:
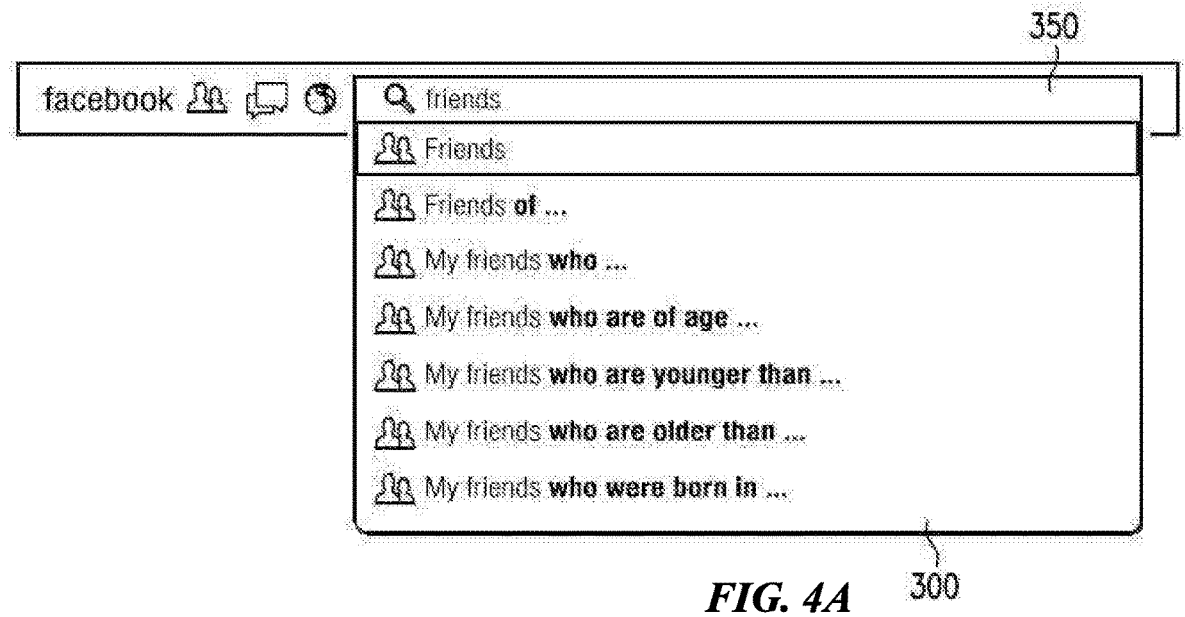
FIG. 4A-4B illustrate example queries of the social network.
Figure 4B:
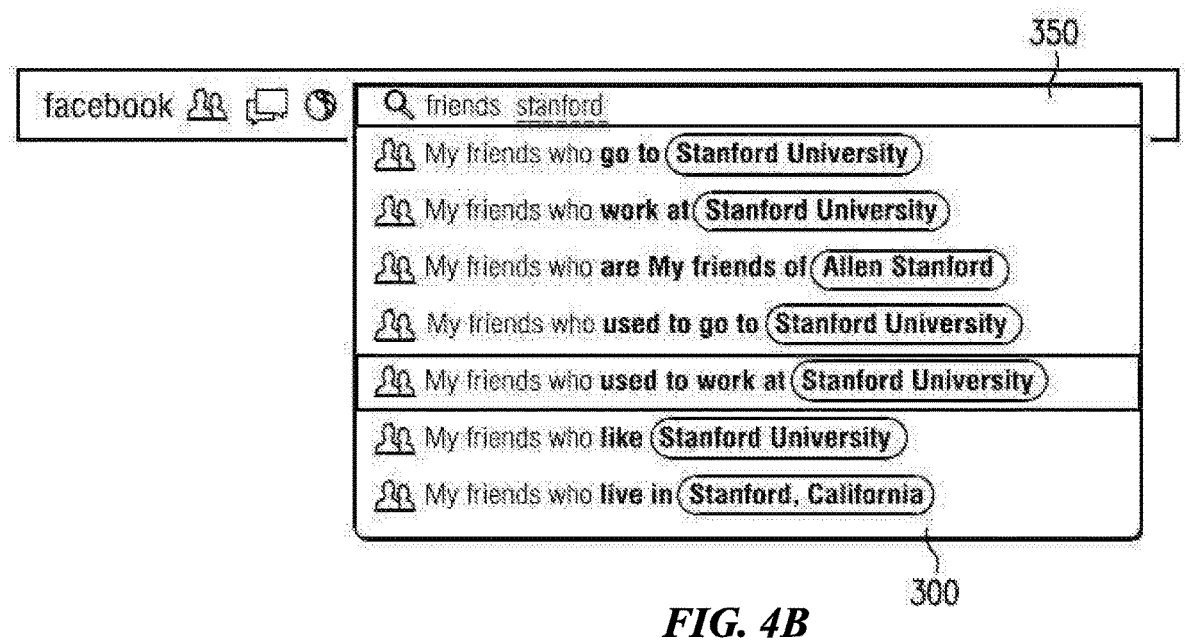

FIGS. 4A-4B illustrate example queries of the social network. In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. These structured queries may be presented to the querying user, who can then select among the structured queries to indicate which social-graph element the querying user intended to reference with the ambiguous term. In response to the querying user's selection, the social-networking system 160 may then lock the ambiguous term in the query to the social-graph element selected by the querying user, and then generate a new set of structured queries based on the selected social-graph element. FIGS. 4A-4B illustrate various example text queries in query field 350 and various structured queries generated in response in drop-down menus 300 (although other suitable graphical user interfaces are possible). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu 300 (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes and FIGS. 4A-4B illustrate generating particular structured queries in a particular manner, this disclosure contemplates generating any suitable structured queries in any suitable manner.

In particular embodiments, the social-networking system 160 may receive from a querying/first user (corresponding to a first user node 202) an unstructured text query. As an example and not by way of limitation, a first user may want to search for other users who: (1) are first-degree friends of the first user; and (2) are associated with Stanford University (i.e., the user nodes 202 are connected by an edge 206 to the concept node 204 corresponding to the school "Stanford"). The first user may then enter a text query "friends stanford" into query field 350, as illustrated in FIGS. 4A-4B. As the querying user enters this text query into query field 350, the social-networking system 160 may provide various suggested structured queries, as illustrated in drop-down menus 300. As used herein, an unstructured text query refers to a simple text string inputted by a user. The text query may, of course, be structured with respect to standard language/grammar rules (e.g. English language grammar). However, the text query will ordinarily be unstructured with respect to social-graph elements. In other words, a simple text query will not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query will not necessarily be in the format of a query command that is directly executable by a search engine (e.g., the text query "friends stanford" could be parsed to form the query command "intersect(school (Stanford University), friends(me)", or "/search/me/friends/ [node ID for Stanford University]/students/ever-past/intersect", which could be executed as a query in a social-graph database). Although this disclosure describes receiving particular queries in a particular manner, this disclosure contemplates receiving any suitable queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, U.S. patent application Ser. No. 13/732,101, filed 31 Dec. 2012, and U.S. patent application Ser. No. 13/887,015, filed 3 May 2013, each of which is incorporated by reference.

Suggested Keywords for Searching Content of Online Social Networks

Figure 5:
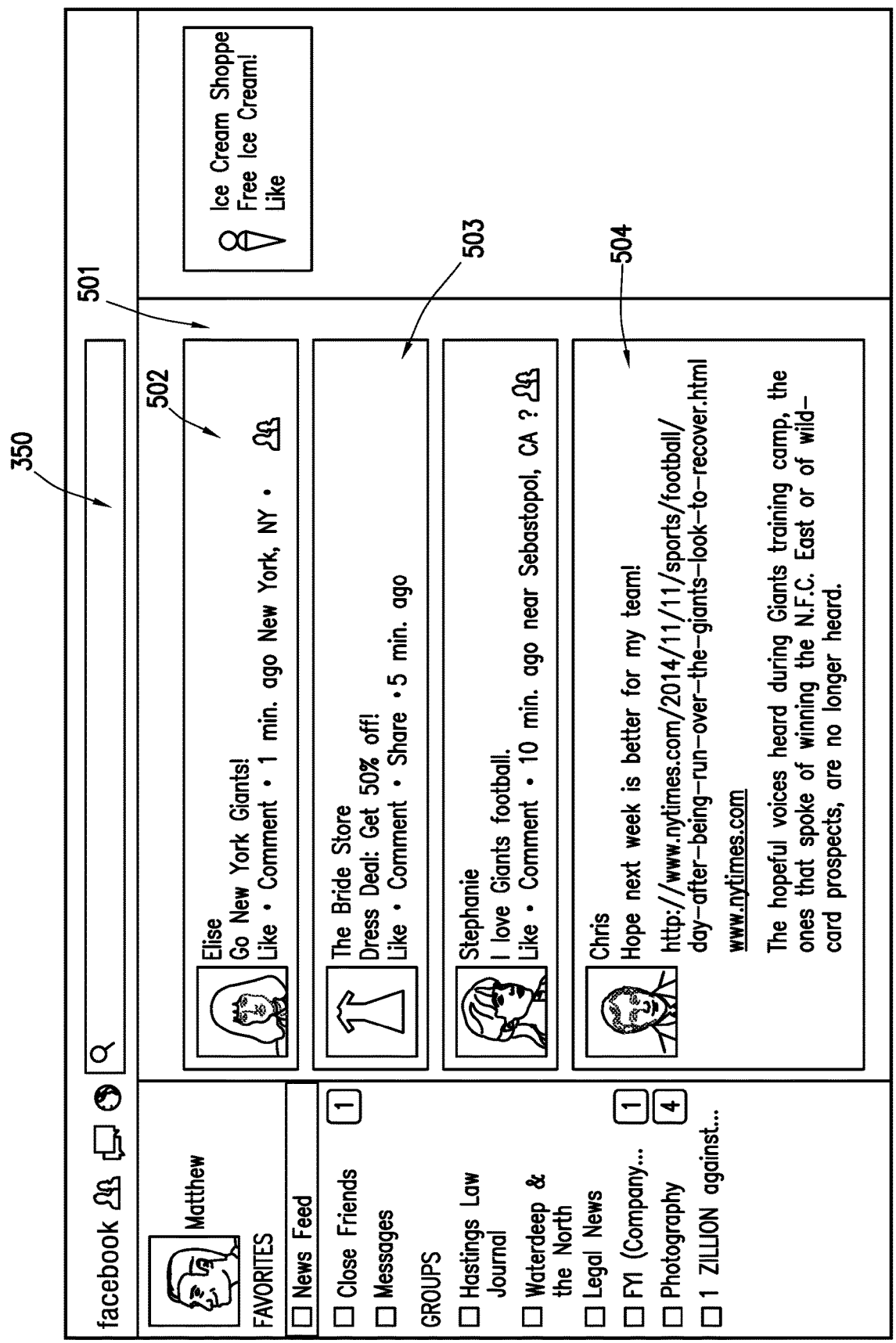
FIG. 5 illustrates an additional example page of an online social network.
Figure 6:
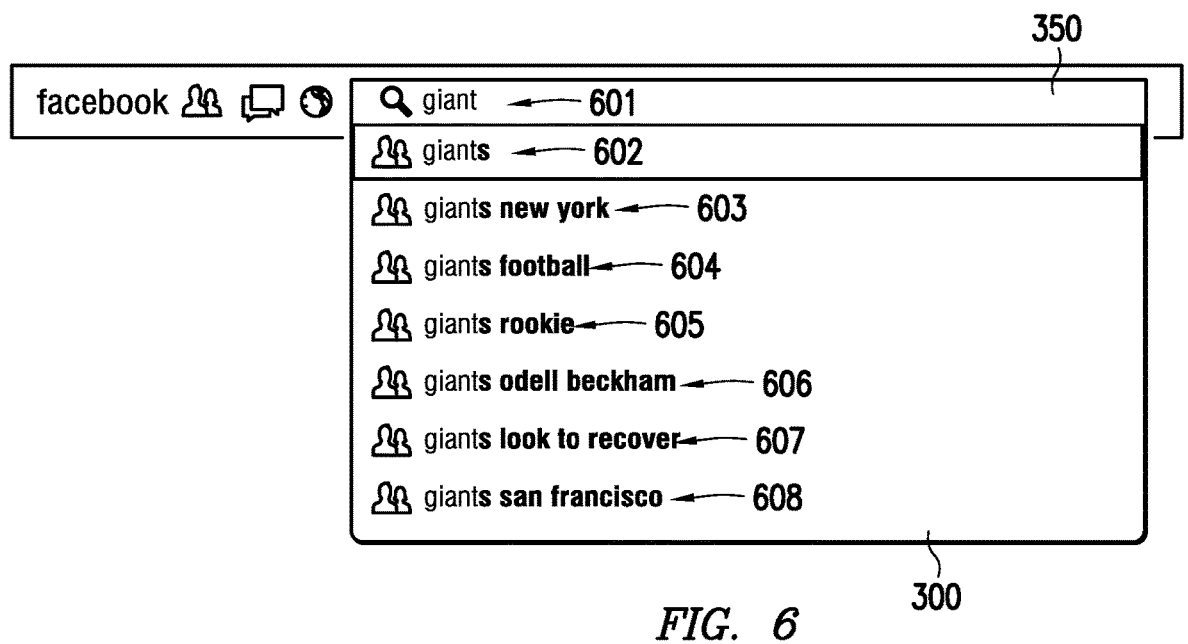
FIG. 6 illustrates additional example queries of the social network.

FIG. 5 illustrates an example page of an online social network; FIG. 6 illustrates example queries of the social network. In particular embodiments, social-networking system 160 may generate and provide personalized keyword suggestions (herein referred to simply as "keyword suggestions" or "query suggestions") to a querying user based on posts (or other suitable content of the online social network) the user has seen or could have seen (for example, posts by the querying user's friends, or posts by users within a threshold degree of separation of the querying user, posts having a privacy setting making them visible to the user, posts that are made public, etc.). As an example and not by way of limitation, the user could have seen a post if the user was eligible to see the post (for example, because the post was made public), but the post was not included in the user's news feed 501 because the process for generating news feeds did not select the post for inclusion in the user's news feed 501 (for example, because it was not considered relevant to the user's interests, because it was not a popular post, etc.) As another example and not by way of limitation, the user could have seen a post if the post was actually included in the user's news feed, but the user did not scroll far enough down his news feed to see it. The keywords suggestions may be provided in response to the user inputting a text string into a query field 350. To generate the keyword suggestions, the social-networking system 160 may generate an index of phrases associated with the querying user by extracting keywords from posts (e.g., 502, 503, 504) the user has seen or could have seen. From this set of keywords, the social-networking system 160 may identify phrases from the index of phrases that match the query. Matching phrases may then be scored and/or ranked, and top scoring/ranking keywords may be sent back to the querying user as keyword suggestions (e.g., 602-608) to complete the user's query. As an example and not by way of limitation, if a first user, "Matthew", has engaged with a number of posts related to the New York Giants professional football team, the social-networking system 160 may generate an index of phrases including "giants", "giants new york", and "giants football". As an example and not by way of limitation, referencing FIG. 5, the user Matthew may view posts 502, 503, 504 in his news feed 501. If the user Matthew enters "giant" 601 into the query field 350, the social-networking system 160 may provide the user Matthew with the keyword suggestions "giants" 602, "giants new york" 603, "giants football" 604, "giants rookie" 605, "giants odell beckham" 606, "giants look to recover" 607, and "giants san francisco" 608 (where the bolded text shows additional text added to the user's original query in order to generate the keyword suggestion). In this example, the social-networking system 160 is suggesting the keywords which are modification of the ambiguous n-gram "giant". As another example and not by way of limitation, if a second user, "Janet", has engaged with a number of posts related to the San Francisco Giants professional baseball team, the social-networking system 160 may generate an index of phrases including "giants", "giants san francisco", and "giants baseball". If the user Janet enters "giant" into the query field 350, the social-networking system 160 may provide Janet with the keyword suggestions "giants", "giants san francisco", and "giants baseball". In this example, the social-networking system 160 is again suggesting the keywords which are modification of the ambiguous n-gram "giant", however the suggested keywords are different for the user Janet (compared to the user Matthew) because she has engaged with different posts. Although this disclosure describes suggesting keywords for searching news feeds in a particular manner, this disclosure contemplates suggesting keyword for searching news feeds in any suitable manner. Furthermore, although this disclosure describes suggesting keywords for searching for posts in news feeds, this disclosure contemplates suggesting keywords for search for any suitable content of the online social network.

In particular embodiments, social-networking system 160 may receive, from a client system 130 of a first user of an online social network, an unstructured text query to search for posts of the online social network. The text query may be entered, for example, into a query field 350. The text query may include one or more n-grams. As an example and not by way of limitation, social-networking system 160 may receive from a client system 130 a query such as "giant" or "friends giants". In particular embodiments, the social-networking system 160 may parse the text query to identify one or more n-grams. For example and not by way of limitation, at least one of the n-grams may be an ambiguous n-gram. As noted above, if an n-gram is not immediately resolvable to a single social-graph element based on the parsing algorithm used by the social-networking system 160, it may be an ambiguous n-gram. The parsing may be performed as described in detail hereinabove. As an example and not by way of limitation, the social-networking system 160 may receive the text query "friends giants". The text query may be parsed into the ambiguous n-gram "giants" and the n-gram "friends". In this example, "giants" may be considered an ambiguous n-gram because it does not match a specific element of social graph 200. By contrast, "friends" refers to a specific type of user node 202 (i.e., user nodes 202 connected by a friend-type edge 206 to the user node 202 of the querying user), and therefore may not be considered ambiguous. Although this disclosure describes receiving and parsing a text query in a particular manner, this disclosure contemplates receiving and parsing a text query in any suitable manner.

In particular embodiments, social-networking system 160 may search an index of keyword phrases associated with the first user to identify one or more keyword phrases matching one or more of the n-grams of the text query. The index of keyword phrases may be based on posts by one or more second users of the online social network. As an example and not by way of limitation, referencing FIG. 6, in response to the query "giant" 601 from a first user (i.e., the user "Matthew") social-networking system 160 may search an index of keyword phrases associated with the user. The index of keyword phrases may be based on posts 502, 503, 504 by one or more second users ("Elise", "Stephanie", and "Chris", respectively) of the online social network, as illustrated in FIG. 5. As an example and not by way of limitation, the index of keyword phrases may include the terms "giants new york" and "giants football," which appear in posts 502, 503, and 504. The phrases may be associated with posts by users Elise, Stephanie, and Chris. As an example and not by way of limitation, the first phrase "giants new york" may be associated with a post 502 created by the user Elise which says "Go New York Giants!", where the keywords "new york" and "giants" are extracted from the post 502. The second phrase, "giants football" may be associated with a post 503 created by the user Stephane which says "I love Giants Football", where the keywords "love", "giants" and "football" are extracted from the post 503. In particular embodiments, social-networking system 160 may generate the index of keyword phrases by extracting keyword phrases from a set of posts authored by one or more second users of the online social network. As an example and not by way of limitation, the social-networking system 160 may extract the keyword phrase "giants new york" from the post 502 posted by the user Elise. As another example, and not by way of limitation, the social-networking system 160 may extract the keyword phrase "giants football" from the post 503 posted by Stephanie. In particular embodiments, the social-networking system 160 may generate the index of keyword phrases responsive to receiving the unstructured query. As an example and not by way of limitation, the social-networking system may generate the index by performing a full posts search, including all posts (or a limited number of posts) the first user has seen or could have seen after receiving the query. Generating the index of keywords responsive to receiving the query may be beneficial because it may generate keywords based on very recent posts and does not require storage. In particular embodiments, the social-networking system 160 may generate the index of keyword phrases prior to receiving the unstructured text query. As an example and not by way of limitation, the social-networking system may generate the index by performing a full posts search, including all posts (or a limited number of posts) the first user has seen or could have seen prior receiving the query. Generating the index of keywords prior to receiving the query (i.e., offline) may be beneficial because the method may be performed more quickly, and it may be performed without an internet connection. Although this disclosure describes generating and searching an index of keyword phrases in a particular manner, this disclosure contemplates generating and searching an index of keyword phrases in any suitable manner. Additional ways of generating an index of keyword phrases are discussed below.

In particular embodiments, the set of posts may include posts the first user has viewed. As an example and not by way of limitation, the user Matthew (specifically the user node 202 associated with the user Matthew) may be connected to each of the users Elise and Stephanie (specifically the user nodes 202 associated with the users Elise and Stephanie, respectively) by an edge 206 (e.g., a friend-type edge 206). Therefore, the user Matthew may have seen the posts 502, 503 by the users Elise and Stephanie. The posts may have appeared in the user Matthew's news feed 501 or may have appeared if the user Matthew visited a page associated with either user Elise or Stephanie. In particular embodiments, the set of posts may include posts the first user could have viewed, but has not necessarily viewed yet. As an example and not by way of limitation, a post may be placed on a profile page of the querying user's friend. If the querying user had visited the friend's profile page he or she may have seen the post. However, if the querying user has not recently visited the friend's profile page, the post may not have been viewed by the querying user. In particular embodiments, each post in the set of posts may be associated with a privacy setting defining a visibility of the post. The set of posts may include posts having a visibility that is visible to the first user. As an example and not by way of limitation, the posts 502, 503 may have a privacy setting that that specifies which other users of the online social network may view or access the content and may include users connected by a friend-type edge 206 to the user node 202 of the author of the post. More information on filtering search results based on privacy settings may be found in U.S. patent application Ser. No. 13/556,017, filed 23 Jul. 2012, which is incorporated by reference. In particular embodiments, the set of posts may include posts within a particular timeframe. As an example and not by way of limitation, the set of posts may be limited to posts posted in the past day, week, month, year, or other suitable time frame. In particular embodiments, the set of posts may include posts authored by one or more second users within a threshold degree of separation of the first user in the social graph. The threshold degree of separation may be one degree, two degrees, three degrees, or any suitable number of degrees of separation. As an example and not by way of limitation, if the threshold is two degrees of separation, and the user Matthew is connected to a user ("Emily") by greater than two degrees, posts authored by the user Emily will not be included in the set of posts. In particular embodiment, the method may include generating the index of keyword phrases by extracting keyword phrases from one or more third-party pages linked in a set of posts authored by one or more second users of the online social network. As an example and not by way of limitation, the user Chris may create a post 504 which links to an article about the New York Giants on the website of the New York Times (www.nytimes.com). The social-networking system 160 may extract keyword phrases from the article on the third-party website www.nytimes.com. As an example and not by way of limitation, the social-networking system may create the keyword phrase "giants look to recover", which is in the title of the article in the post 504. Additionally or alternatively, the social-networking system 160 may extract keyword phrases from the body of the article, for example, "giants rookie" and "giants odell beckham" (where the terms "rookie" and "odell beckham" may be extracted from the text of the article, which is not illustrated in FIG. 5, where Odell Beckham Jr. is a rookie player for the New York Giants football team).

In particular embodiments, the social-networking system 160 may generate the index of keyword phrases from the set of posts based on a term frequency-inverse document frequency (TF-IDF) analysis of the content of each post in the set of posts. The TF-IDF is a statistical measure used to evaluate how important a word is to a document (e.g., a post) in a collection or corpus (e.g., a set of posts). The importance increases proportionally to the number of times a word appears in a particular document, but is offset by the frequency of the word in the corpus of documents. The term count in a document is simply the number of times a given term appears in the document. This count may be normalized to prevent a bias towards longer documents (which may have a higher term count regardless of the actual importance of that term in the document) and to give a measure of the importance of the term t within the particular document d. Thus we have the term frequency tf(t,d), defined in the simplest case as the occurrence count of a term in a document. The inverse-document frequency (idf) is a measure of the general importance of the term which is obtained by dividing the total number of documents by the number of documents containing the term, and then taking the logarithm of that quotient. A high weight in TF-IDF is reached by a high term frequency in the given document and a low document frequency of the term in the whole collection of documents; the weights hence tend to filter out common terms. In particular embodiments, TF-IDF analysis may be used to determine one or more keyword from the n-grams included in the content of a post. As an example and not by way of limitation, a TF-IDF analysis of post 504 may determine that the n-grams "giants" "training camp" and "wild-card" should be extracted as keywords, where these n-grams have high importance within post 504. Similarly, a TF-IDF analysis of post 504 may determine that the n-grams "the", "that", "or", and "of" should not be extracted as keywords, where these n-grams have a low importance within post 504 (because these are common terms in many posts).

In particular embodiments, social-networking system 160 may calculate a keyword score for each of the identified keyword phrases. The score may be based on a variety of factors (which are discussed in more detail below). In particular embodiments, the score may be based at least in part on a number of times the first user has engaged with the post on which the keyword phrase is based. As an example and not by way of limitation, referencing FIG. 5, if the user Matthew has engaged several times with a post 502 which is the basis for the keyword phrase "giants new york", for example, by viewing the post, liking the post, and commenting on the post, the keyword phrase "giants new york", as illustrated in FIG. 6, may receive a relatively high score. In contrast, if the user Matthew has not engaged with a post which is the basis for the keyword phrase "giants san francisco", as illustrated in FIG. 6, for example, because the user Matthew could have viewed the post, but did not, and has not engaged in any other way with the post, the keyword phrase may receive a relatively low score. In particular embodiments, the social-networking system 160 may calculate the keyword score for each of the identified keyword phrases based at least in part on the popularity of the post on which the keyword phrase is based. As an example and not by way of limitation, if the post 502 illustrated in FIG. 5 that is the basis for the keyword phrase "giants new york" illustrated in FIG. 6 is more popular (for example, has more views, comments, likes) than the post 503 that is the basis for the keyword phrase "giants football", then the keyword phrase "giants new york" may receive a relatively higher score. In particular embodiments, the social-networking system 160 may calculate the keyword score for each of the identified keyword phrases based at least in part on a number of times a keyword phrase has been selected (for example, as part of a suggested query containing the keyword phrase). As an example and not by way of limitation, if the user Matthew has previously selected (e.g., clicked on, inputted, entered, etc.) the suggested query "giants new york" one or more times, the keyword phrase "new york" may receive a relatively high score. However, if the user Matthew has never selected the suggested query "giants look to recover", the keyword phrase "look to recover" may receive a relatively low score. In particular embodiments, the keyword score for each of the identified keyword phrases may be calculated based at least in part on the number of times the keyword phrase has been searched. Keyword phrases that have been searched with greater frequency may be given a relatively high score. As an example and not by way of limitation, if the user Matthew has previously search "giants new york" several times, it may receive a relatively high score. In particular embodiments, the keyword score for each of the identified keyword phrases may be calculated based at least in part on discriminative features of the keyword phrase. As an example and not by way of limitation, if the keyword phrases are rare or representative of the post, the keyword phrases may receive a relative high score. As an example and not by way of limitation, the word "rookie" may appear in only a limited number of posts, and therefore the keyword phrase "giants rookie" may receive a relatively high score. In particular embodiments, the keyword score for each of the identified keyword phrases may be calculated based at least in part on a time decay. Time decay may eliminate keyword phrases associated with posts posted outside a given time limit or may provide keyword phrases associated more recent posts with a higher (or lower) score. As an example and not by way of limitation, if a first keyword phrase (e.g., "giants new york") is associated with a post posted in the last minute, and a second keyword phrase (e.g., "giants") is associated with a post posted in the last ten minutes, the first keyword phrase may receive a relatively higher score than the second keyword phrase. In particular embodiments, the keyword score for each of the identified keyword phrases may be calculated based at least in part on the edit distance between the keyword phrase and the text query. Edit distance is a way of quantifying how dissimilar two strings (e.g., words) are to one another by counting the minimum number of operations required to transform one string into the other. As an example and not by way of limitation, if the user Matthew has inputted the text query "new pork", the keyword suggestion for "new york city" may receive a relatively low score because of an operation would be required to transform "pork" into "york", while the keyword suggestion for "new pork recipes" may receive a relatively high score because no operations would be required to match it to the original text query. Edit distance may also be considered when adding new terms to the end of the suggested query, where each additional term in the suggested query compared to the original text query increased the edit distance. The keyword score may be based on one or more of the previously described bases. In particular embodiments, the social-networking system 160 may determine, for each identified keyword suggestions, whether the suggested query results in a null-search. The social-networking system 160 may remove each suggested query resulting in a null-search form the generated suggested queries. A null-search, as used herein, refers to a search query that produces zero search results. A null-search may result, for example, if a keyword suggestion is relatively long or detailed. As an example and not by way of limitation, the search string "friends stanford vanderbilt colgate boston" may result in a null-search because no content objects associated with the online social network match all of the terms of the search query. Although this disclosure describes calculating a keyword score in a particular manner, this disclosure contemplates calculating a keyword score in any suitable manner.

In particular embodiments, social-networking system 160 may generate one or more suggested queries. Each suggested query may include one or more n-grams identified from the text query and one or more identified keyword phrases having a keyword score greater than a threshold keyword score. As an example and not by way of limitation, referencing FIG. 6, in response to the query "giant", social-networking system 160 may generate the suggested queries "giants" 602, "giants new york" 603, "giants football" 604, "giants rookie" 605, "giants odell beckham" 606, "giants look to recover" 607, and "giants san francisco" 608. In this example, the social-networking system 160 is suggesting the keywords which are modification of the ambiguous n-gram "giant" by using identified keyword phrases from the posts illustrated in FIG. 5, as described previously. The suggested queries include the n-gram "giant" identified in the text query, and may include a keyword phrase having a keyword score greater than a threshold keyword score. As an example and not by way of limitation, the top-seven identified keyword phrases may be used to generate suggested queries comprising the identified keyword phrases. Although this disclosure describes generating suggested queries in a particular manner, this disclosure contemplates generating suggested queries in any suitable manner.

In particular embodiment, social-networking system 160 may send, to the client system 130 of the first user for display in response to receiving the text query, one or more of the suggested queries to search for posts of the online social network. As an example and not by way of limitation, referencing FIG. 6, in response to the query "giant" 601 entered into the query field 350, the social-networking system 160 may send to the client system 130 of the first user the following suggested queries: "giants" 602, "giants new york" 603, "giants football", "giants rookie" 605, "giants odell beckham" 606, "giants look to recover" 607, and "giants san francisco" 608. The query suggested queries may be displayed, for example, in a drop-down menu 300. The suggested queries may be sorted by their score (e.g., the score associated with the identified keyword phrase included in the suggested query). As an example and not by way of limitation, the suggested query "giants" may have a relatively high score because it is associated with a large number of posts 502, 503, 504, and the user has engages with several of those posts 502, 503, 504. Additionally, the suggested query "giants" has the lowest edit distance from the original text query "giant". In contrast, "giants san francisco" may have a relatively low score, for example, because the user has not viewed the post on which the suggested query is based (which may be, for example, a post on the profile page of the querying user's friend, where the querying user has not recently viewed the friend's profile page). Therefore, the query suggestion "giants san francisco" 608 is as the bottom of the drop-down menu 300. In particular embodiments, the social-networking system 160 may display the suggested queries on a user interface of a native application associated with the online social network on the client system of the first user. As an example and not by way of limitation, the native application may be an application associated with the social-networking system on a user's mobile client system (e.g. the Facebook Mobile app for smart phones and tablets). In particular embodiments, the social-networking system 160 may display the suggested queries on a webpage of the online social network accessed by a browser client 132 of the client system 130 of the first user (e.g., the landing page for www.facebook.com). Although this disclosure sending suggested queries in a particular manner, this disclosure contemplates sending suggested queries in any suitable manner.

Figure 7:
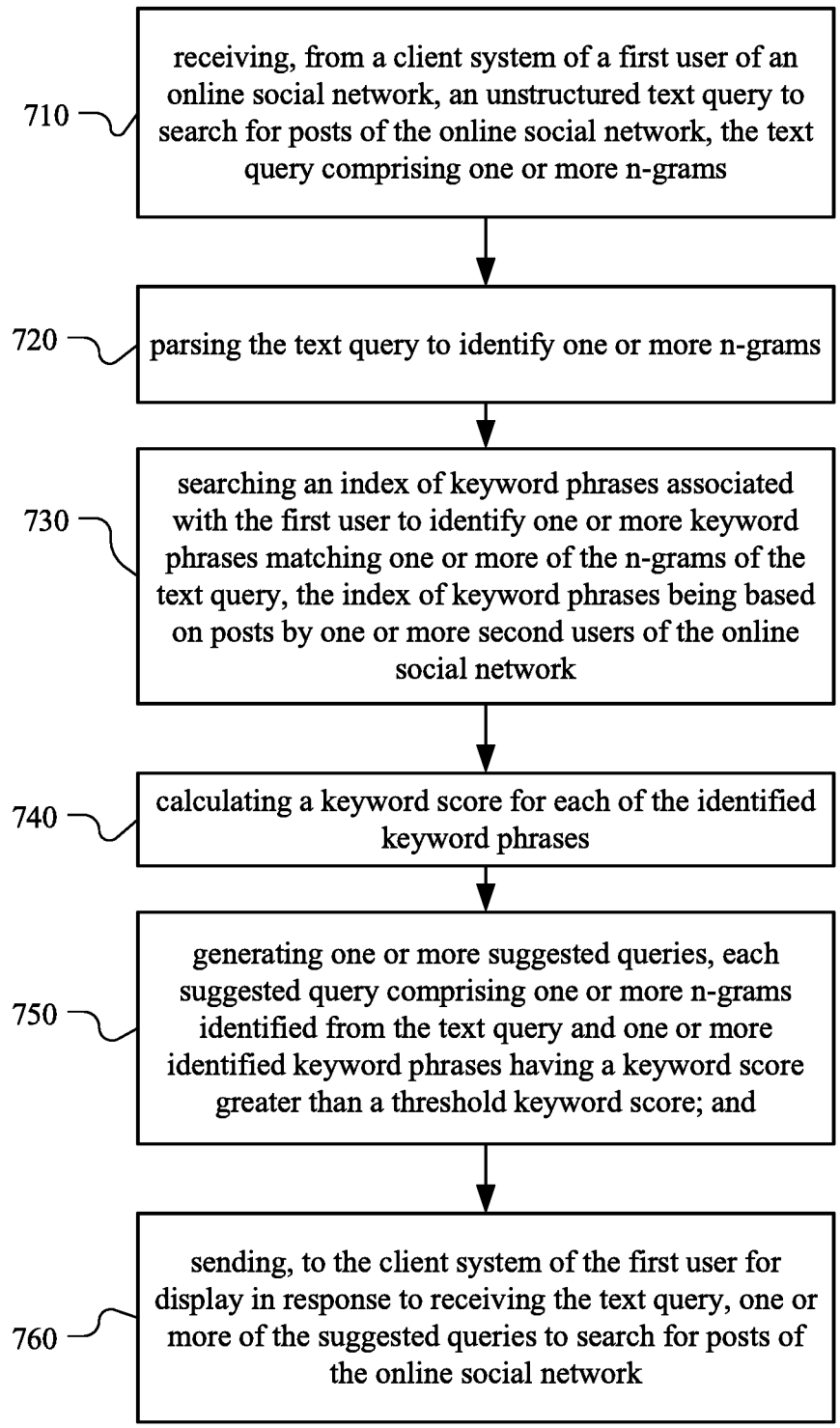
FIG. 7 illustrates an example method for generating suggested keywords for searching news feeds.

FIG. 7 illustrates an example method 700 for generating suggested keywords for searching news feeds. The method may begin at step 710, where social-networking system 160 may receive, from a client system of a first user of an online social network, an unstructured text query to search for posts of the online social network, the text query comprising one or more n-grams. At step 720, social-networking system 160 may parse the text query to identify one or more n-grams. At step 730, social-networking system 160 may search an index of keyword phrases associated with the first user to identify one or more keyword phrases matching one or more of the n-grams of the text query, the index of keyword phrases being based on posts by one or more second users of the online social network. At step 740, social-networking system 160 may calculate a keyword score for each of the identified keyword phrases. At step 750, social-networking system 160 may generate one or more suggested queries, each suggested query comprising one or more n-grams identified from the text query and one or more identified keyword phrases having a keyword score greater than a threshold keyword score. At step 760, social networking system 160 may send, to the client system of the first user for display in response to receiving the text query, one or more of the suggested queries to search for posts of the online social network. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for generating suggested keywords for searching news feeds including the particular steps of the method of FIG. 7, this disclosure contemplates any suitable method for generating suggested keywords for searching news feeds including any suitable steps, which may include all, some, or none of the steps of the method of FIG. $, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attenStephaniece at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 8:
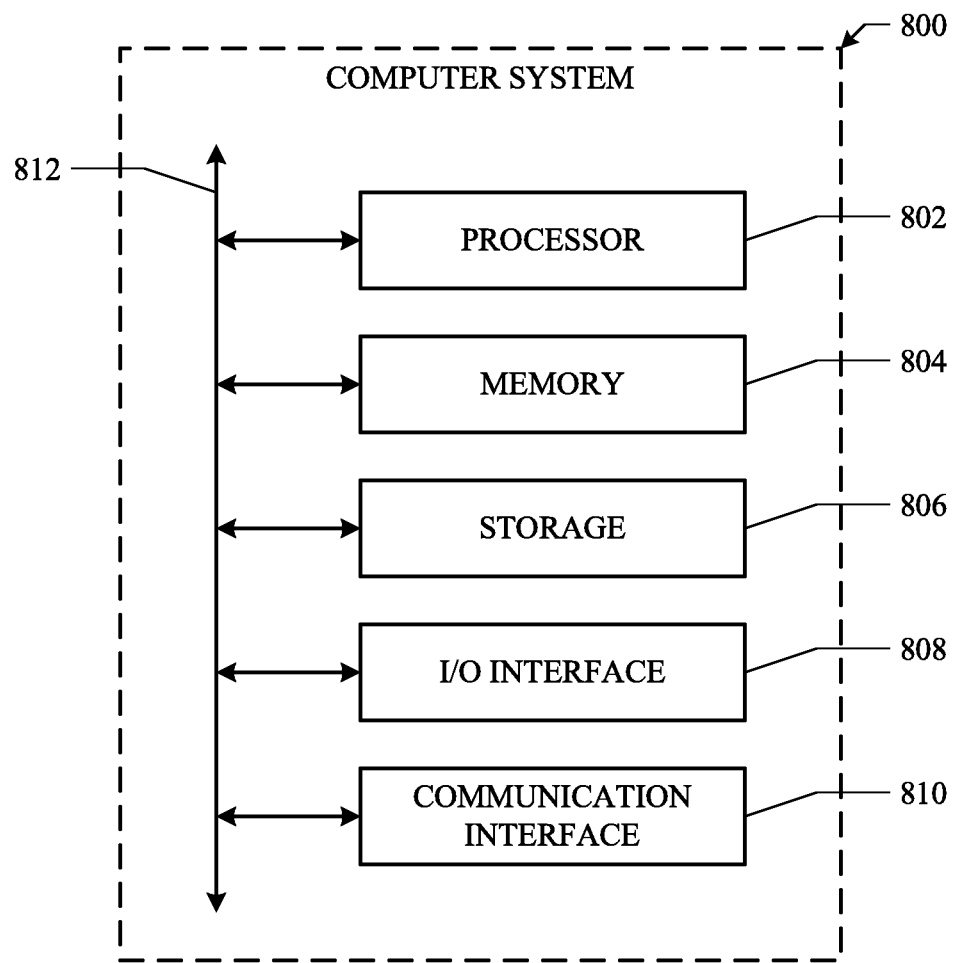
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives (MODDs), floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:

receiving, by the one or more computing devices, from a client system of a first user of an online social network, a text query to search for posts of the online social network, the text query comprising one or more n-grams;

searching, by the one or more computing devices, a personalized index of keyword phrases associated with the first user to identify one or more keyword phrases matching one or more of the n-grams of the text query, the index of keyword phrases being based on content extracted from posts by one or more second users of the online social network that have been viewed by the first user; and providing, by the one or more computing devices, to the client system of the first user in response to receiving the text query, instructions for displaying a user interface comprising one or more of suggested queries to search for posts of the online social network, wherein each suggested query comprises one or more n-grams from the text query and one or more of the identified keyword phrases.

2. The method of claim 1, further comprising:

accessing a social graph comprising a plurality of nodes and a plurality of edges connecting the nodes, each of the edges between two of the nodes representing a single degree of separation between them, the nodes comprising:

a first node corresponding to the first user;

one or more user nodes corresponding to the one or more second users, respectively; and a plurality of post nodes corresponding to a plurality of posts of the online social network, respectively, each post node being connected to one or more user nodes by one or more edges.

3. The method of claim 1, further comprising generating the index of keyword phrases by extracting keyword phrases from a set of posts authored by the one or more second users.

4. The method of claim 3, wherein each post in the set of posts is associated with a privacy setting defining a visibility of the post, and wherein the set of posts comprises posts having a visibility that is visible to the first user.

5. The method of claim 3, wherein the set of posts comprises posts within a specified timeframe.

6. The method of claim 3, wherein the set of posts comprises posts authored by one or more second users within a threshold degree of separation of the first user in a social graph.

7. The method of claim 3, wherein generating the index of keyword phrases comprises extracting keyword phrases from the set of posts based on a term frequency-inverse document frequency (TF-IDF) analysis of the content of each post in the set of posts.

8. The method of claim 3, wherein generating the index of keyword phrases is performed responsive to receiving the text query.

9. The method of claim 3, wherein generating the index of keyword phrases is performed by an offline process prior to receiving the text query.

10. The method of claim 1, further comprising generating the index of keyword phrases by extracting keyword phrases from one or more third-party pages linked in a set of posts authored by one or more second users of the online social network.

11. The method of claim 1, wherein calculating the keyword score for each of the identified keyword phrases is calculated based at least in part on a number of times the first user has engaged with the post on which the keyword phrase is based.

12. The method of claim 1, wherein calculating the keyword score for each of the identified keyword phrases is calculated based at least in part on a popularity of the post on which the keyword phrase is based.

13. The method of claim 1, wherein calculating the keyword score for each of the identified keyword phrases is calculated based at least in part on a number of times a keyword phrase has been selected.

14. The method of claim 1, further comprising:
determining, for each identified keyword suggestion, whether the suggested query results in a null-search; and
removing each suggested query resulting in a null-search from the generated suggested queries.

15. The method of claim 1, wherein the suggested queries are provided for display on a user interface of a native application associated with the online social network on the client system of the first user.

16. The method of claim 1, wherein the suggested queries are provided for display on a webpage of the online social network accessed by a browser client on the client system of the first user.

17. The method of claim 1, further comprising parsing the text query to identify the one or more n-grams.

18. The method of claim 1, further comprising calculating a keyword score for each of the identified keyword phrases, wherein each suggested query comprises one or more identified keyword phrases that scored greater than a threshold keyword score.

19. The method of claim 1, further comprising:
generating the one or more suggested queries, wherein each suggested query comprises one or more identified keyword phrases having a keyword score greater than a threshold keyword score.

20. One or more computer-readable non-transitory storage media embodying software that is operable when executed to:
receive, from a client system of a first user of an online social network, a text query to search for posts of the online social network, the text query comprising one or more n-grams;
search a personalized index of keyword phrases associated with the first user to identify one or more keyword phrases matching one or more of the n-grams of the text query, the index of keyword phrases being based on content extracted from posts by one or more second users of the online social network that have been viewed by the first user; and
provide, to the client system of the first user in response to receiving the text query, instructions for displaying a user interface comprising one or more suggested queries to search for posts of the online social network, wherein each suggested query comprises one or more n-grams from the text query and one or more identified keyword phrases.

21. A system comprising: one or more processors; and a non-transitory memory coupled to the processors comprising instructions executable by the processors, the processors operable when executing the instructions to:
receive, from a client system of a first user of an online social network, a text query to search for posts of the online social network, the text query comprising one or more n-grams;
search a personalized index of keyword phrases associated with the first user to identify one or more keyword phrases matching one or more of the n-grams of the text query, the index of keyword phrases being based on content extracted from posts by one or more second users of the online social network that have been viewed by the first user; and
provide, to the client system of the first user in response to receiving the text query, instructions for displaying a user interface comprising one or more of the suggested queries to search for posts of the online social network, wherein each suggested query comprises one or more n-grams from the text query and one or more identified keyword phrases.

* * * * *